(No Model.) 4 Sheets—Sheet 1.

T. CUMMINS.
BICYCLE ATTACHMENT.

No. 491,040. Patented Jan. 31, 1893.

WITNESSES:
Edward O. Rowland
Francis P. Reilly

INVENTOR
T. Cummins
BY
P. M. Voorhees
ATTORNEY

THE NORRIS PETERS CO., PHOTO-LITHO., WASHINGTON, D. C.

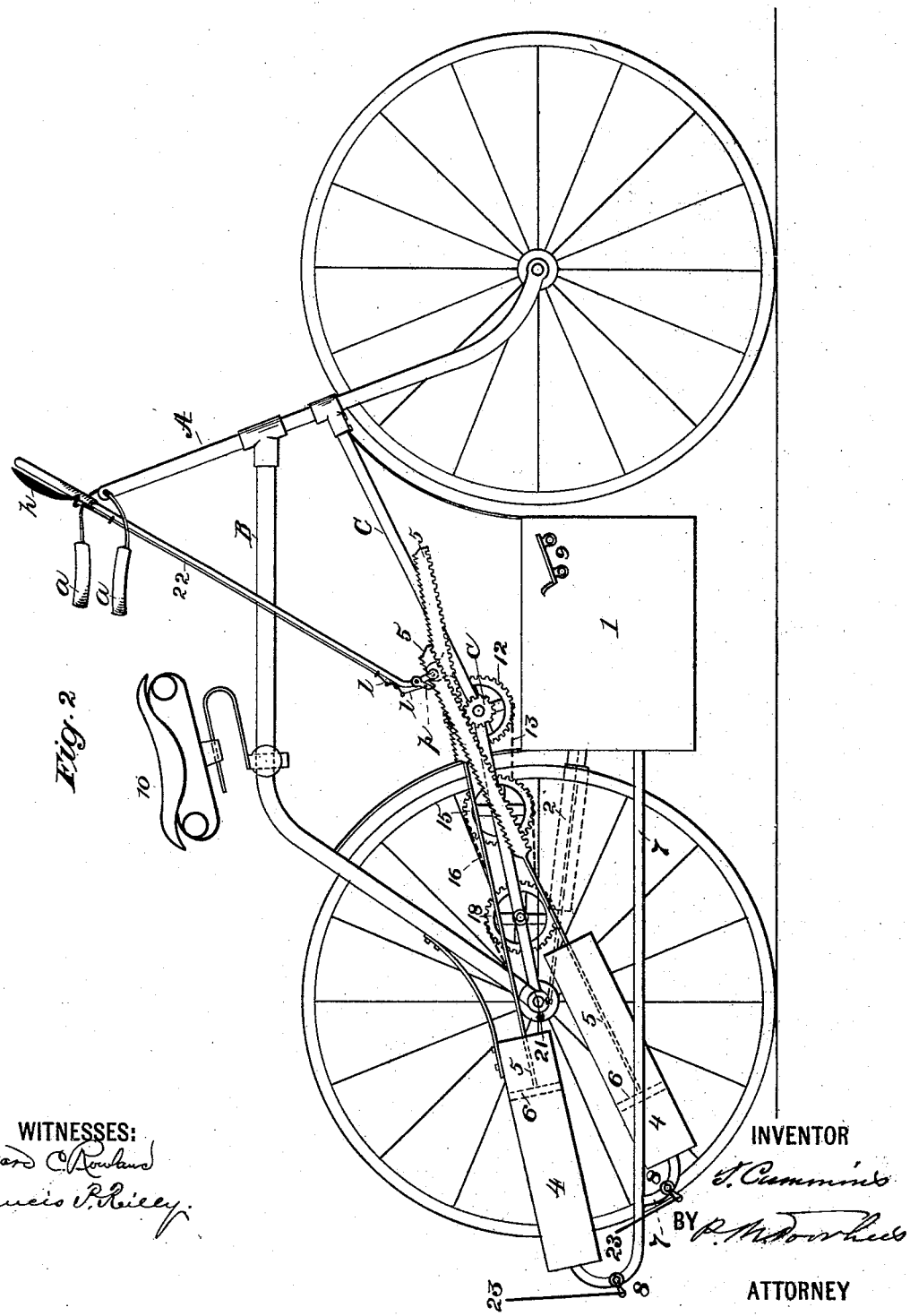

(No Model.)  4 Sheets—Sheet 3.
T. CUMMINS.
BICYCLE ATTACHMENT.

No. 491,040.  Patented Jan. 31, 1893.

WITNESSES:
Edward C. Rowland
Francis P. Reilly

INVENTOR
T. Cummins
BY
P. M. Dowlies
ATTORNEY (No Model.) 4 Sheets—Sheet 4.
T. CUMMINS.
BICYCLE ATTACHMENT.
No. 491,040. Patented Jan. 31, 1893.
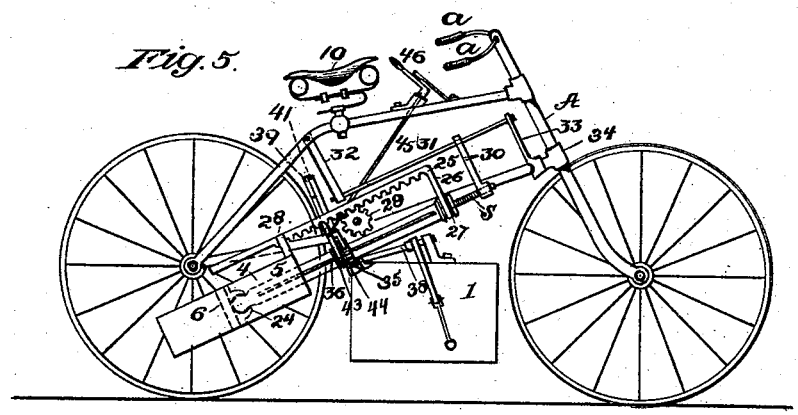
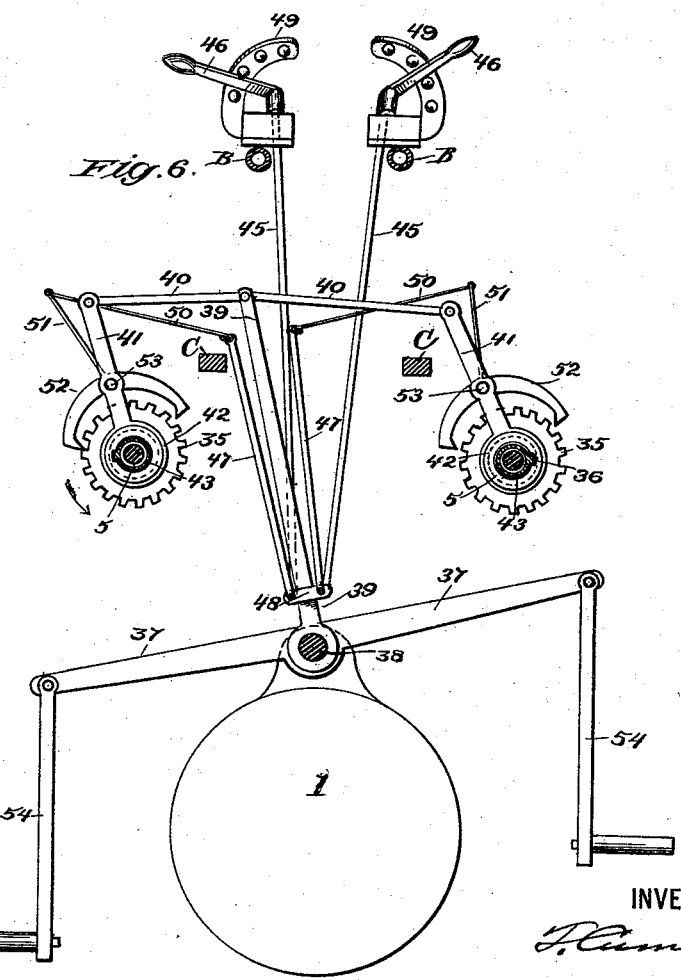
WITNESSES:
INVENTOR
BY
ATTORNEY

UNITED STATES PATENT OFFICE.

THEODORE CUMMINS, OF DOVER, ASSIGNOR OF ONE-HALF TO JACOB C. VAN HORN, OF MARKSBOROUGH, NEW JERSEY.

BICYCLE ATTACHMENT.

SPECIFICATION forming part of Letters Patent No. 491,040, dated January 31, 1893.

Application filed February 18, 1892. Serial No. 421,985. (No model.)

*To all whom it may concern:*

Be it known that I, THEODORE CUMMINS, of Dover, in the county of Morris and State of New Jersey, have invented a new and useful Bicycle or other Vehicle Attachment, whose main features are also applicable to do the work of a stationary engine, which invention is fully set forth and illustrated in the following specification and accompanying drawings.
The object of this invention is, in particular, to provide a vehicle, such as a bicycle or tricycle with means of self-propulsion, by an attached engine or engines operated by compressed air, or by some compressible permanent gas.

The invention will first be described in detail and then particularly set forth in the claims.

Figure 1:
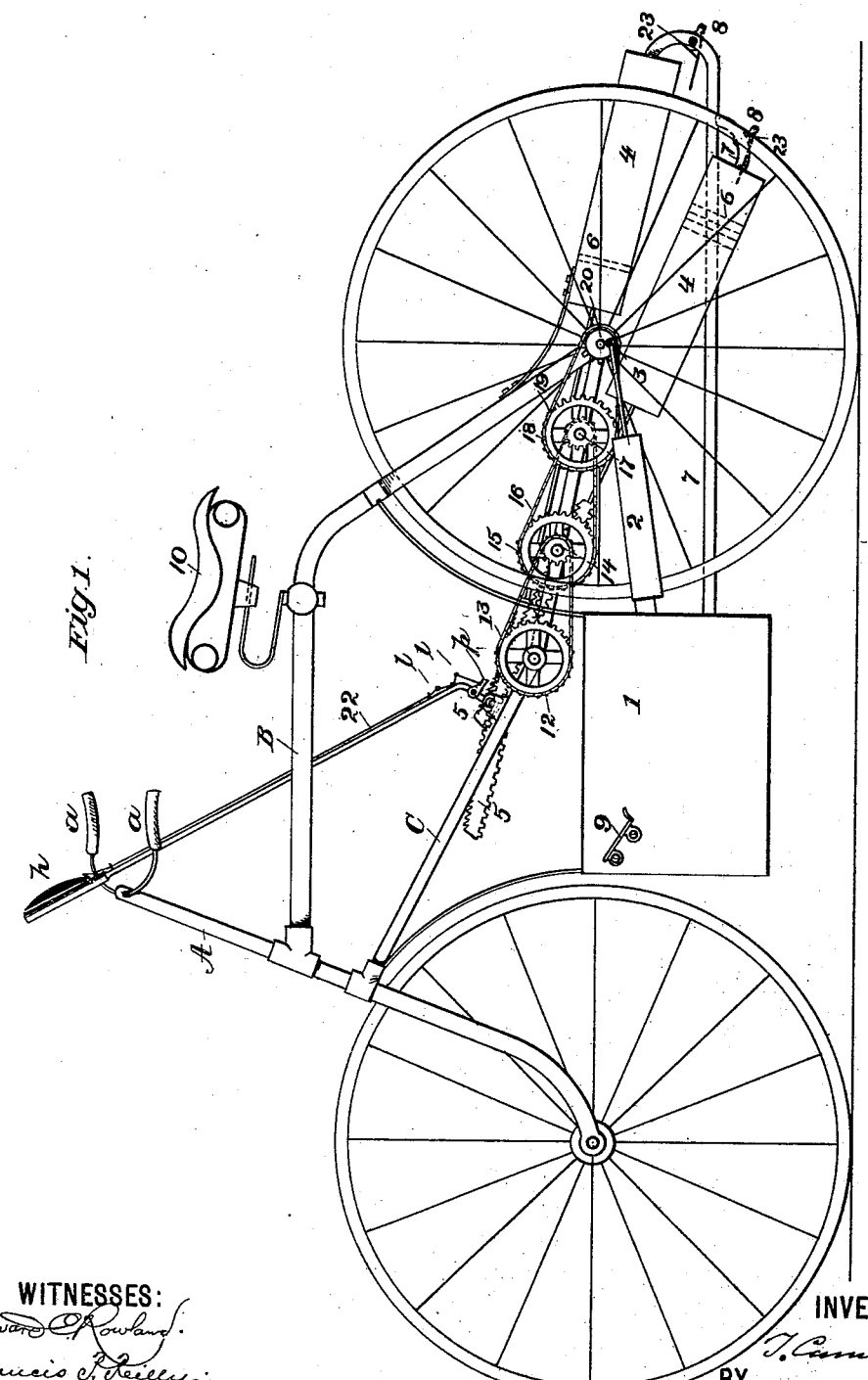
Figure 4:
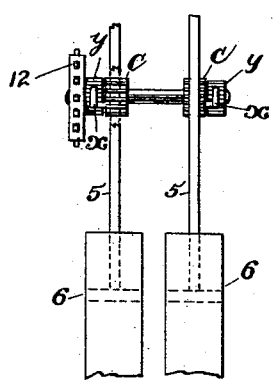
Figure 3:
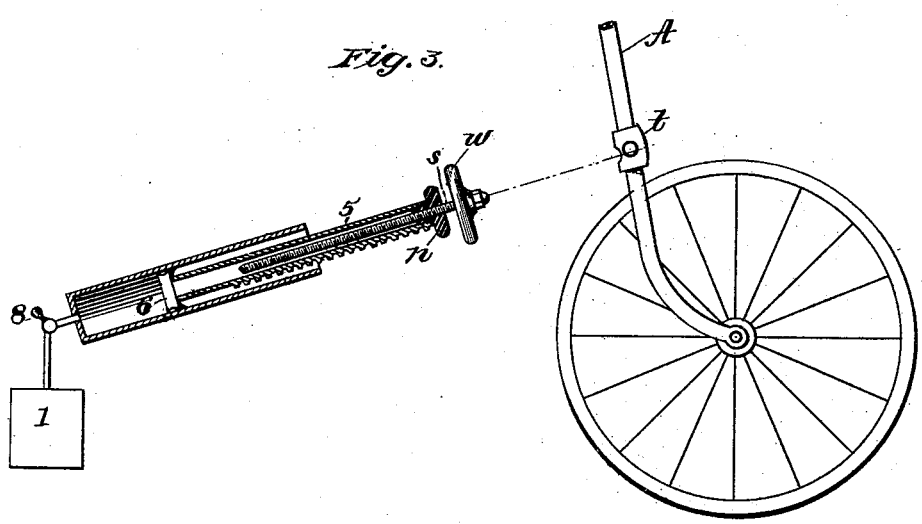

In the accompanying drawings, Figure 1, shows a bicycle in side elevation having my invention applied thereto. Fig. 2, shows the same bicycle in side elevation looked at from the opposite side. Figs. 3 and 4 show details of construction, hereinafter described. Figs. 5 and 6 show modification of construction, hereinafter described.

In said figures, the several parts are indicated by reference numbers and letters as follows:
Referring now to Figs. 1, 2 and 4:—Between the wheels, and under any ordinary frame of a bicycle, consisting of the members A, B, C, A being the steering-post, is suspended by suitable supports, a tank or receiver 1, of sufficient strength to withstand a minimum internal pressure of say two hundred pounds per square inch, of compressed air or some permanent gas, but preferably air. Connected to said tank is a compression pump 2, actuated by an eccentric or crank 3, on the rear axle of the machine. Connected to the frame members B and C, respectively, are the cylinders 4, having each a piston rod 5, connected to a single-acting piston 6, said rods being provided with, or continued out beyond the cylders as, toothed rack-bars. The teeth of said rack bars engage or are in mesh with small spur wheels or pinions c, journaled in the frame member C. Said pinions give motion to a train of chain belt and sprocket-wheel-gearing, which rotates the axle of the hind wheels as hereinafter described. Supply or feed pipes 7, connect the tank 1 with the cylinders 4. Said pipes are provided with cocks or valves 8, for opening and closing communication between said tank and cylinders. Suitable foot rests 9 are conveniently secured to each side of the tank 1, and a seat or saddle 10, is also provided. The steering-post A is provided with handles a, a, as usual.

The machine is self propelled in the manner, now to be described, as follows: Journaled in the frame member C, are two spur pinions c, one of each in mesh with the piston-racks 5, and having each on the same axis therewith a ratchet wheel y (Fig. 4) hereinafter more particularly described. Endless chains 13 connect the sprocket wheel 12, mounted on the member C on the same shaft carrying the pinions c, with sprocket pinions 14, having each, on the same axis therewith and journaled in the frame member C, sprocket wheels 15. Endless chains 16, connect said sprocket-wheels with sprocket-pinions 17, having each on the same axis therewith journaled in said frame member, sprocket wheels 18. Endless chains 19, connect said sprocket-wheels with sprocket-pinions 20, secured fast on the axletree 21 of the rear wheel of the bicycle. It will be observed therefore that this gearing is of a high multiple, one stroke of either of the piston-racks 5 causing a great number of revolutions in the wheel. With a high pressure in the tank and a proper volume displacement of piston, a single stroke of piston may suffice, with a high multiple of gearing, to drive the vehicle over smooth roads for a half mile or mile, before a second stroke of piston becomes necessary, which second stroke is prepared for in the following manner. The piston must be forced backward, compressing the air behind it back into the tank 1 through the cock or cocks, 8, depending upon whether one or two pistons are simultaneously or successively applied, either of which methods may be adopted. Figs. 1, 2 and 4 show two single acting pistons, capable of either simultaneous or successive action. Of course but one piston may be fitted instead of two, if preferred. One means of forcing back the pistons is shown in Fig. 3, a screw rod s and hand wheel w, being provided for said purpose. The screw rod s, passes through a nut n in the outer end of the hollow piston-rack 5. When the piston is doing its work in moving out of its cylinder, the rod s remains screwed fast into the hollow piston rod 5; but when the piston rod has reached the end of its working stroke the outer end of the screw rod 5 is brought by the piston-rod near or touching the stop t, on the steering-post A; now, by unscrewing the rod s by hand, or otherwise, said rod will move outward and tend to lengthen the piston-rod 5, and thus force the piston back against the pressure in the tank 1. After the piston has been forced back, the cock 8 is closed, the screw rod s screwed again into the piston rod and the machine is ready for a fresh departure by the reopening of the cock 8. This is a simple and powerful means for forcing back the piston for the latter to commence a new stroke. But this means is typical only of means for accomplishing the same purposes by two more complete mechanisms shown in Figs. 1, 2, 5 and 6 one of which can be operated by hand and the other by the feet.

By means of the levers l and pawls p, shown in Figs. 1 and 2, the pistons are "pinched" back tooth by tooth, as the pawls p successively take into the ratchet teeth of the racks 5. Rods or wires 22 lead from the pawls p, Fig. 1, to a clutch handle h, on the levers l, in order that the rider may raise and lower the pawls to engage and disengage them with and from the teeth of the rack rods 5. Wires or rods 23, may also lead from the starting cocks 8 to the member B, near the handles a, so that the rider may open and close said cocks at will.

In Fig. 4, are shown in detail the spur-pinions c carrying pawls x, which engage, after the manner of ratchet pawls, ratchet teeth on the ratchet wheels y. Said ratchet wheels are keyed, or otherwise secured fast on their shafts or journals, or one or both of said wheels may be cast as part of the sprocket wheel 12, while the spur-pinions c are loose, so as to revolve independently of the shaft on which they are mounted. So that when the piston-rod-racks 5, are forced backward, the pawls will slip over the teeth of the ratchet-pinions y, and thus offer no resistance to the backward movement of the pistons 6 within their cylinders 4.

Referring now to Figs. 5 and 6, a method is therein shown of forcing back the piston, (after it has performed its forward propulsive stroke) by rotating its hollow piston rod 5. The effect of this rotation is to cause the thrust of the screw threads, on the rod s, to force back the piston 6, in the time dependent upon the pitch of said threads and the speed of the piston rod's rotation. The same means, rotating said piston rod in the contrary direction, will pull the screw rod s, without rotating it, within the bore of the piston rod and thus leave a clearance for the advance of the piston at any time before it reaches the extreme of its forward propulsive stroke. The hollow piston rod 5 is connected to the piston 6 by a ball joint 24, and a rack bar 25 is connected by an arm 26 to the end of said piston-rod, an eye in said arm spanning a double or grooved collar 27 on the end of said rod so that the rod may turn freely in said eye. Said rack bar is guided in an arm 28, on the top-side of the cylinder 4 and is held permanently in mesh with the gear pinion 29, by which, through chain-gearing (such as is shown in Figs. 1 and 2 hereinbefore described) power is transmitted to the rear axle. The end of the hollow piston rod forms a threaded nut for the screw-rod, s, and said rod has an arm 30 secured fast on its outer end, which arm extends upward to a rod 31 which rod acts as a guide or slide for said arm and thereby also prevents the screw rod s from turning. The guide rod 31 is screwed fast at one end to an arm 32 dependent from the frame of the machine and at the other end to an arm 33 secured to an eye 34 on the steering-post A in which eye said post may turn. The arm 33 near its base acts as a stop or thrust-block for the screw rod s, when the piston rod is rotated in one direction, which rotation in effect, lengthens the hollow piston-rod, by which lengthening, the piston is forced back into the cylinder. The piston rod is rotated in either direction by the mechanism below described.

On the outside of the hollow piston-rod 5 is the ratchet wheel 35 secured thereon by a feather 36, so that when said rod is turned by the revolution of said wheel, the revolution of the rod acting, as a nut, on the screw rod s, will cause the latter to either advance or recede in a right line without turning, according to the direction of revolution of the piston rod. The method of rotating the ratchet wheel 35, and, by it, the hollow piston rod 5, is accomplished by a treadle motion of simple construction. Fig. 6, is an enlarged diagram (illustrative of the general view Fig. 5), partly in perspective showing the connections of the several parts, placed out of line with each other as far as may be necessary to prevent one part being obscured by another. The treadle bar 37 forms two arms of a rock shaft 38 journaled on top of the tank 1. From the rear end of said shaft an arm 39 is extended upward and near its top two rods 40, are articulated, their respective opposite ends being each articulated to an arm 41 having an eye 42 in its lower end through which eyes said rods are loosely mounted on prolonged hubs 43 of the two ratchet wheels 35. Said wheels being secured one each on its respective piston rod 5 by a feather 36 are prevented from end-motion or play by fitting each wheel in a groove or channel plate 44 on the tank 1. As said diagram shows an arrangement for operating two pistons and as the operation of each piston and its attachments is the same, the description of one arrangement will be understood to apply equally to both. A light shaft 45, having two crank arms 46, 47, is journaled at its upper end in the frame member B and at its lower end in a bearing 48 on the arm 39. The upper crank arm is a handle and is held in one of three positions in notches on the spring radius bar 49 secured to the frame-member B. To the lower crank arm 47 is articulated a rod 50 whose other end is articulated to a spring arm 51 secured to the double pawl 52. Said pawl is mounted so that it can be oscillated on a pin or stud 53 on the arm 41. When the arm 46 is in its middle position on the radius bar 49 both ends of the pawl 52 are out of engagement with the teeth on the ratchet wheel 35, and when said arm or handle is in either of its side positions, one end or the other of said pawl is held so as to gear with said teeth. When one end of the pawl is in gear, it will push the ratchet-wheel around in one direction (rotating with it the hollow piston rod 5) and when the other end is in gear it will push said wheel in the opposite direction. It is obvious now that a simple rocking motion of the treadle bar 37 by the suspended treadles 54 will oscillate the arm 39 and cause said arm to thereby rotate the piston rod 5 through the intervening pawl and ratchet devices described.

It can now be readily understood that when the piston reaches the end of its outward propulsive stroke bringing the end of the screw rod s, up against the thrust-block 33 that then, by the movement imparted to the treadle by the feet, the hollow piston rod may be rotated and thus force the piston back again, by the piston rod unscrewing or lengthening itself on the rod s. When the piston has thus been forced back, it may be immediately released and again advance, under tank pressure, by the throwing in of the other pawl and again working the treadle to shorten the piston-rod as before described. This operation will require practically no effort of strength in the operator and the treadle stroke may be long and quick, the pawl skipping several teeth on its backward motion, thus quickly drawing the rod s down into the hollow piston rod, and practically shortening the piston rod, before the piston has again completed another outward stroke. Of course when it is desired to force the piston back, this can only be done with comparative slowness against the tank pressure, though this may be done in a shorter time than that fixed for the piston's outward movement said movement being made designedly very slow, by suitable gearing to the rear axle, as hereinbefore described.

The main principle upon which this machine operates is that there is no exhaust of the fluid used as the motive agent. None of it escapes or is lost, save that which escapes through accidental leakage past the pistons and cocks. This leakage is made up and the normal pressure maintained by the pump 2, operated by an eccentric or crank 3 fixed on the axle of the rear wheel. Advantage can be taken of going down hill to run this pump in restoring all leakage. The tank 1 may be originally filled by this pump or from any suitable source. In going up hill both pistons may be put in propulsive operation together instead of alternately if desired. Thus it will be seen that the vehicle is propelled by a very high mean-pressure. Upon this its efficiency depends. Supposing the initial pressure to be two hundred and five pounds per square inch and that, at the end of one working-stroke, the pressure in the tank, due to expansion into cylinder 4 in following the piston 6, had fallen to one hundred and ninety-five pounds per square inch, then the mean pressure utilized in doing the work would be two hundred pounds per square inch of piston, acting throughout the whole single stroke of the piston during the time required to make such stroke.

If double acting pistons were used for rotary cranks (as is the common method) necessitating the exhausting of the cylinder-air into the atmosphere at each single stroke of the piston, the size and weight of tank, and of other parts required, and the rapid fall of initial pressure, would make such means impracticable for the propulsion of small or light vehicles, to which, in particular, this invention is adapted, though of course it may be used for numerous styles of wheeled vehicles, from bicycles and tricycles to light road-wagons and railroad hand-dummies. And with a tank and cylinder of suitable volumes, the form shown in Fig. 3, is well suited to furnish storage for an intermittent power, for such light work as is done by coffee mills, ventilating fans &c., used in stores, restaurants, &c.

While I have shown several means for forcing back the pistons 6, I do not confine myself to these alone, as it is evident that, the rack bars 5, may be pushed back by numerous mechanical devices well known to mechanics. The pinch-bar, l, may be preferably employed in the case of the lighter machines, but for heavier machines, a hydraulic pinch-bar, such as is commonly used for moving heavy weights slowly may be substituted for a simple pinch-bar, or the screw rod s, operated by hand directly, or by hand or foot and suitable auxiliary mechanism, may be employed for the heavier or larger vehicles carrying my invention. Neither do I confine myself to the precise location of the several connecting parts, as the same connections may be differently located in machines of different size and construction.

Having thus fully described my said invention, I claim:—

1. The combination of a cylinder for containing a fluid under pressure and provided with a single-acting-power-piston; gearing connecting said piston to a driving or power-transmitting shaft; and means substantially as described for forcing back said piston against its impelling fluid-pressure, as and for the purposes set forth.

2. The combination with a tank or reservoir, for holding fluid under pressure, and a cylinder provided with a single acting piston; means for opening and closing communication between said reservoir and cylinder and means substantially as described for forcing back said piston against its impelling fluid-pressure, as and for the purposes set forth.

3. The combination of a cylinder for containing a fluid under pressure, and provided with a single acting power piston, gearing connecting said piston to a driving or power transmitting shaft; a screw threaded rod for controlling the stroke of said piston; and a fixed stop or block for taking the thrust of said screw threaded rod, substantially as and for the purposes set forth.

4. The combination of a cylinder for containing a fluid under pressure, and provided with a piston and hollow rotary piston rod, gearing connecting said piston rod to a driving or power transmitting shaft, a screw threaded rod extending within said piston rod; and a fixed stop or block for taking the thrust of said screw-threaded-rod, substantially as and for the purposes set forth.

5. The combination of a cylinder, for containing a fluid under pressure, provided with a single acting power piston; a hollow ball-jointed-piston-rod; a screw threaded rod extending within said piston rod; a rack-bar and gearing connecting said piston rod to a driving or power transmitting shaft; a fixed thrust block for said screw rod, and means for rotating said piston-rod, substantially as and for the purposes set forth.

6. In a bicycle, or other locomotor-machine, the combination of a cylinder, for containing fluid under pressure, provided with a single-acting-piston and a rotary piston rod; a rack bar and gearing connecting said rod to the axle of the machine; a screw threaded rod and thrust-block therefor and a treadle-motion and gearing for rotating said piston rod, substantially as and for the purposes set forth.

7. In a bicycle, or other locomotor-machine, the combination of a cylinder, for containing fluid under pressure, provided with a single-acting-piston and a rotary piston-rod; a rack-bar and gearing connecting said rod to the axle of the machine; a screw-threaded-rod and thrust-block therefor; and a treadle-motion and ratchet-gearing for rotating said piston-rod in either direction, substantially as and for the purposes set forth.

THEODORE CUMMINS.

Witnesses:
EDWARD D. NEIGHBOUR,
JAMES H. NEIGHBOUR.